United States Patent [19]

Rodgers et al.

[11] Patent Number: 4,864,812

[45] Date of Patent: Sep. 12, 1989

[54] COMBINED AUXILIARY AND EMERGENCY POWER UNIT

[75] Inventors: Colin Rodgers, San Diego; Roy W. Vershure, Jr., Escondido, both of Calif.

[73] Assignee: Sundstrand Corporation, Rockford, Ill.

[21] Appl. No.: 119,978

[22] Filed: Nov. 13, 1987

[51] Int. Cl.⁴ .............................................. F02C 6/16
[52] U.S. Cl. ............................. 60/39.091; 60/39.15; 60/39.33; 60/727
[58] Field of Search ............ 60/39.163, 39.142, 39.15, 60/39.091, 39.33, 39.141, 727

[56] References Cited

U.S. PATENT DOCUMENTS

| | | | |
|---|---|---|---|
| 981,546 | 1/1911 | DeFerranti | 60/39.33 |
| 1,588,885 | 6/1926 | Hart. | |
| 2,599,480 | 6/1952 | Pfenninger. | |
| 2,723,531 | 11/1955 | Wosika et al. | |
| 3,100,378 | 8/1963 | Austin et al. | |
| 3,171,252 | 3/1965 | Trowbridge et al. | |
| 3,662,975 | 5/1972 | Driskill | 244/58 |
| 3,965,673 | 6/1976 | Friedrich | 60/39.15 |
| 4,092,824 | 6/1978 | Friedrich | 60/39.02 |
| 4,309,914 | 1/1982 | Hiersig et al. | 74/15.4 |
| 4,312,179 | 1/1982 | Zaugg | 60/39.142 |
| 4,392,393 | 6/1983 | Montgomery | 74/661 |
| 4,502,277 | 3/1985 | Papastavros | 60/39.181 |
| 4,759,178 | 7/1988 | Joy | 60/39.142 |

FOREIGN PATENT DOCUMENTS

| | | | |
|---|---|---|---|
| 2642347 | 4/1977 | Fed. Rep. of Germany | 60/39.142 |
| 255224 | 11/1986 | Japan | 60/39.142 |

Primary Examiner—Donald E. Stout
Attorney, Agent, or Firm—Wood, Dalton, Phillips, Mason & Rowe

[57] ABSTRACT

Weight and spatial concerns in aircraft are alleviated or minimized through a combined auxiliary and emergency power unit including a gear box 10 adapted to drive a generator 16 and a hydraulic pump 18 as auxiliary to emergency power supplies for the aircraft. The system includes a pair of turbine wheels 22 and 24 along with a pair of motion transmitting paths 12, 26, 42; 14, 68, each including a selectively operable clutch 42, 68 so as to connect the turbine wheels 22, 24 to the gear box 10 in mechanical parallel. A rotary compressor 28 is connected to one of the turbine wheels 22 and an associated combustor 46 provides combustion gas to the turbine wheel 22 for auxiliary power unit operation. A pressure tank 56 for compressed oxidant and an additional combustor 60 are utilized to provide combustion gas to the other turbine wheel 24 in an emergency power unit mode of operation.

5 Claims, 1 Drawing Sheet

COMBINED AUXILIARY AND EMERGENCY POWER UNIT

FIELD OF THE INVENTION

This invention relates to a power unit useful in, for example, aircraft and, which combines features of an auxiliary power unit and an emergency power unit to be useful in performing the tasks ordinarily expected of either.

BACKGROUND OF THE INVENTION

In so-called fly-by-wire aircraft, aircraft control surfaces are not linked to the controls by mechanical means. Rather, the linking is via electrical or hydraulic circuits. Consequently, in the event of an electrical or hydraulic failure, the aerodynamic configuration of the aircraft cannot be altered under the control of the pilot until power is restored. As a result, such aircraft require an emergency power unit which is capable of responding to a power failure and providing a sizable quantity of electrical or hydraulic energy in very short order so that control of the aircraft can be returned to the pilot.

Fly-by-wire aircraft, like other aircraft of more than basic simplicity, also require an auxiliary power unit for providing electrical and hydraulic energy and bleed air when the main engine or engines of the aircraft are not in use. Quite typically, both an emergency power unit and an auxiliary power unit will each employ a gas turbine engine coupled to a generator and a hydraulic pump. Thus, where an aircraft employs an emergency power unit and an auxiliary power unit, there will be two systems with a substantial degree of redundancy. This of course requires a certain space on the aircraft and will cause some weight concerns.

While in some aircraft an auxiliary power unit may be easily adapted to serve as an emergency power unit as well and thereby minimize space requirements as well as weight concerns, the adaptation is not so simple on high performance aircraft that may operate at rather high altitudes. In particular, because a typical auxiliary power unit turbine is an air breathing turbine, at high altitudes the density of the air will be insufficient to start the turbine and rapidly bring the same up to a speed at which it will operate at that altitude to produce emergency power in an emergency situation.

To meet these and other problems, Friedrich, in his U.S. Pat. No. 4,092,824, issued June 6, 1978, proposes a turbine for use in aircraft for starting purposes as well as for driving auxiliary equipment such as a generator and which is capable of operating in a conventional air breathing mode as well as in an emergency mode that does not require the presence of air. In particular, Friedrich includes a supply of hydrazine on the aircraft. Hydrazine is capable of undergoing an exothermic decomposition reaction and the heat from this reaction is utilized by Friedrich to vaporize aircraft fuel to thereby provide a volume of hot gas to drive the turbine in an emergency situation.

While this solution does solve a number of the previously specified problems, it also creates some new ones. In particular, the decomposition products of hydrazine can accumulate much like soot within the turbine and that will decrease turbine efficiency when operating conventionally. Perhaps more significantly, because the basis of such system is that of an exothermic decomposition reaction, it necessarily follows that a fuel such as hydrazine, which is utilized in the system, must be sufficiently unstable as to rapidly undergo decomposition. Of course, the presence of a fuel that is not stable in the conventional sense on an aircraft presents hazards of its own.

Still another difficulty resides in the fact that hydrazine and proper storage facilities therefore may not be available at all ground support locations for the aircraft. Thus, the servicing of a system whose hydrazine fuel charge has been partially or wholly consumed becomes a problem, particularly since hydrazine is toxic and is not easily handled.

Consequently, there is a need for a combined auxiliary power unit and emergency power unit system which can be easily serviced to minimize logistic difficulties at ground support locations, both from the standpoint of equipment necessary to support the system and from the standpoint of ease of handling. The present invention is directed to solving these problems.

SUMMARY OF THE INVENTION

It is the principal object of the invention to provide a new and improved power unit which combines auxiliary power unit and emergency power unit functions. More particularly, it is an object of the invention to provide such a combined auxiliary and emergency power units which may be easily supported from the logistic standpoint.

An exemplary embodiment of the invention achieves the foregoing object in a power unit alternatively useable as an auxiliary power unit and an emergency power unit which includes a gear box adapted to drive a generator, pump or the like. The system includes a pair of turbine wheels and a pair of motion transmitting paths, each including a selectively operable clutch, connecting the turbine wheels to the gear box in mechanical parallel. A rotary compressor is connected to one of the turbine wheels and includes an associated combustor for providing combustion gas to the one turbine wheel. The system is completed by a pressure tank and associated combustor for providing combustion gas to the other of the turbine wheels.

As a consequence of the foregoing construction, the system may operate as a conventional auxiliary power unit by coupling the one turbine wheel to the gear box to drive the same. The one turbine wheel and associated rotary compressor will operate conventionally in an air breathing mode.

In case of a need for emergency power unit operation, the now non-operating first turbine wheel is decoupled from the gear box while the second turbine wheel is driven by fuel and gasses of combustion resulting from oxidation of the fuel by oxidant from the pressure tank and then coupled to the gear box. Because the oxidant is stored, it is available at even extremely high altitudes making the emergency power unit operation of the system independent of the availability of air for conventional turbine operation.

Preferably, the compressed oxidant is air or an oxygen enriched air.

In a preferred embodiment of the invention, a combined auxiliary and emergency power unit is envisioned which includes a gear box and energy producing equipment mechanically coupled to the gear box to be driven when the gear box is provided with the rotary power input. First and second turbine wheels are provided and first and second clutches respectively selectively couple the first and second turbine wheels to the gear box to provide a rotary power input thereto. A rotary compressor is connected to the first turbine wheel to be driven thereby and provides a compressed air source. A first combustor is included for receiving fuel and compressed air from the compressor and combusting the same. A first nozzle is connected to the first combustor and directs products of combustion therefrom at the first turbine wheel to drive the same and thus cause auxiliary power unit operation when the first clutch is engaged. The system includes a high pressure storage container for storing compressed oxidant and a second combustor is provided for receiving fuel and compressed oxidant from the storage container and combusting the same. A second nozzle is connected to the second combustor for receiving combustion gas therefrom and directing the same et the second turbine wheel to drive the second turbine wheel and thus cause emergency power unit operation when the second clutch is engaged.

In a highly preferred embodiment, the compressor inlet is provided with movable guide vanes and means are provided for moving the guide vanes between open and closed positions.

Other objects and advantages will become apparent from the following specification taken in connection with the accompanying drawings.

DESCRIPTION OF THE DRAWINGS

The FIGURE is a schematic view of a combined auxiliary and emergency power unit made according to the invention.

DESCRIPTION OF THE PREFERRED EMBODIMENT

Figure 1:
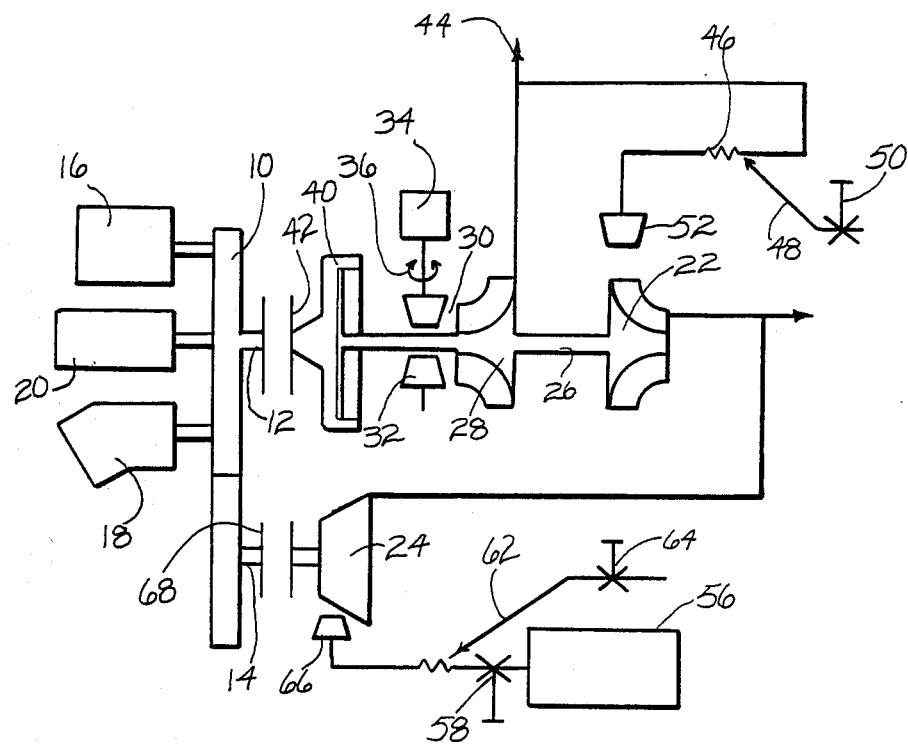

An exemplary embodiment of a combined auxiliary and emergency power unit made according to the invention is illustrated in the FIG. and with reference thereto is seen to include a mechanical gear box 10. The mechanical gear box 10 may receive a rotary input on either a shaft 12 or a shaft 14 and when so driven, is adapted to drive one or more energy producing machines such as an electrical generator 16, a hydraulic pump 18 or any other suitable accessory 20 that might be desirable.

The system includes first and second turbine wheels 22 and 24 respectively. The first turbine wheel 22 is coupled via a shaft 26 to a rotary compressor 28. The compressor 28 includes an inlet area 30 provided with movable guide vanes 32. The guide vanes 32 are conventionally connected to a motor 34 or the like whereby they may be rotated bi-directionally as indicated by an arrow 36 between positions opening and closing the inlet 30.

The shaft 26 extends beyond the compressor to a planetary gear box 40 utilized for speed reduction purposes and then to a selectively operable clutch 42 associated with the input shaft 12 to the gear box 10.

Upon rotation of the shaft 26, the compressor 28 will compress air received by it through the inlet 30. Certain of such air may be used as bleed air as indicated by an arrow 44. The vast majority of the compressed air, however, will be directed to a combustor shown schematically at 46. The combustor 46 may also receive fuel on a line 48, fuel flow being controlled by a valve shown schematically at 50. As a consequence, the fuel and the air will be combusted within the combustor 46 and hot gasses of combustion will flow therefrom to a nozzle 52 which applies the same to the first turbine wheel 22 to drive the same which in turn drives the shaft and all the related components. If the clutch 42 is engaged, the elements 16, 18 and 20 will be driven thereby and the system will be operating as a conventional auxiliary power unit.

Exhaust gasses from the first turbine wheel 22 exit the system as indicated by an arrow 54.

Control of incoming air to the compressor 28 can be controlled by suitable operation of the motor 34 to locate the guide vanes 32 appropriately. The guide vanes 30 may also be moved to a closed position when compressed air is not required at either the combustor 46 or as bleed air to reduce windage losses if the shaft 26 is being rotated. For example, when starting the turbine defined by the turbine wheel 22 and the compressor 28 and related components, it will frequently be desirable to close the inlet 30 through appropriate movement of the guide vanes 32 as the shaft 28 is accelerated by a starter motor or the like toward turbine starting speed.

For operation in an emergency power unit mode of operation, the system also includes a storage container 56 such as one or more high pressure storage bottles capable of storing a compressed oxidant under a pressure of several thousand pounds per square inch. Preferably the oxidant will be compressed air or oxygen enriched air (air whose oxygen content has been increased above the usual 21%).

The container 56 is connected via a valve 58 to a second combustor 60. The combustor 60 may receive fuel on a line 62, the flow of which is controlled by a valve 64. The fuel will be combusted with the stored oxidant to generate gasses of combustion which are then applied by a second nozzle 66 to the second turbine wheel 24 to drive the same. The second turbine wheel 24 may be coupled to the shaft 14 by a selectively operable clutch 68 and when so coupled will provide a source of rotary power to the gear box 10 so that the elements 16, 18 and 20 may be driven.

In normal operation, the clutch 42 will be engaged and the valve 50 controlled to provide the desired quantity of fuel to the first combustor 46. The elements 16, 18 and 20 will be driven by a rotary input applied from the first turbine wheel 22 to the shaft 12.

In the event of system failure requiring emergency power, sensing equipment not shown will operate a suitable control to disengage the clutch 42, manipulate the valves 58 and 64 so as to generate gasses of combustion in the combustor 60 to drive the second turbine wheel 24 and couple the same to the gear box 10 by engaging the clutch 68. Thus the power generating elements 16, 18, 20 will be driven to provide emergency power.

It will be appreciated that operation in an emergency power unit mode can be initiated quite rapidly since there is no dependency on an outside source of oxidant, namely air, the oxidant being stored in the container 56.

It will also be appreciated that by utilizing an oxidant such as air or oxygen enriched air, a nontoxic and readily available material is employed in the emergency power unit mode of operation thereby minimizing logistic difficulties associated with prior art systems.

We claim:

1. A combined auxiliary and emergency power unit comprising:
   a gear box;
   energy producing equipment mechanically coupled to said gear box to be driven when said gear box is provided with a rotary power input;

first and second turbine wheels;

first and second clutches for respectively coupling said first and second turbine wheels to said gear box to provide a rotary power input thereto;

a rotary compressor connected to said first turbine wheel to be driven thereby and for providing a compressed air source;

a first combustor for receiving fuel and compressed air from said compressor and combusting the same;

a first nozzle connected to said first combustor and for directing products of combustion therefrom at said first turbine wheel to drive the same and thus cause auxiliary power unit operation when said first clutch is engaged;

a high pressure storage container for storing a compressed air-based oxidant;

a second combustor for receiving fuel and compressed oxidant from said storage container and combusting the same; and a second nozzle connected to said second combustor for receiving combustion gas therefrom and directing the same at said second turbine wheel to drive the same and thus cause emergency power unit operation when said second clutch is engaged.

2. The combined auxiliary and emergency power unit of claim 1 wherein said compressor has inlet guide vanes in said inlet; and means for moving said guide vanes between open and closed positions.

3. The combined auxiliary and emergency power unit of claim 1 wherein said energy producing equipment includes an electrical generator.

4. The combined auxiliary and emergency power unit of claim 1 wherein said energy producing equipment includes a hydraulic pump.

5. The combined auxiliary and emergency power unit of claim 1 wherein said energy producing equipment includes an electrical generator and a hydraulic pump.

* * * * *